United States Patent
Rodrigue

(10) Patent No.: US 9,791,072 B2
(45) Date of Patent: *Oct. 17, 2017

(54) CONDUIT GUIDE APPARATUS, SYSTEM, AND METHOD

(71) Applicant: HAWKEN HOLDINGS, LLC, Reno, NV (US)

(72) Inventor: Jesse Rodrigue, Reno, NV (US)

(73) Assignee: HAWKEN HOLDINGS, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,375

(22) Filed: Oct. 29, 2016

(65) Prior Publication Data

US 2017/0102098 A1    Apr. 13, 2017

Related U.S. Application Data

(63) Continuation of application No. 14/288,252, filed on May 27, 2014, now Pat. No. 9,512,941.

(60) Provisional application No. 61/857,632, filed on Jul. 23, 2013.

(51) Int. Cl.
*F16L 3/10* (2006.01)
*F16L 3/13* (2006.01)

(52) U.S. Cl.
CPC .............. *F16L 3/1058* (2013.01); *F16L 3/13* (2013.01)

(58) Field of Classification Search
CPC ...... B62J 2009/0046; B62J 6/18; F16L 3/233; Y10T 24/4465; A47L 9/248; F16B 2/08
See application file for complete search history.

(56) References Cited

U.S. PATENT DOCUMENTS

| | | | |
|---|---|---|---|
| 1,308,869 | A | 7/1919 | Rohmer |
| 2,417,269 | A | 3/1947 | Robertson |
| 2,470,811 | A | 5/1949 | Engleman |
| 2,858,093 | A | 10/1958 | Knoll |
| 3,322,381 | A | 5/1967 | Bubb |
| 3,893,647 | A | 7/1975 | Kennedy |
| 4,002,349 | A | 1/1977 | Dopp |
| 4,024,604 | A | 5/1977 | Klimek et al. |
| D244,612 | S | 6/1977 | Burns |
| 4,064,601 | A | 12/1977 | Miyagishima |
| 4,204,297 | A | 5/1980 | Yasunaga et al. |
| 4,244,542 | A | 1/1981 | Mathews |

(Continued)

OTHER PUBLICATIONS

International Search Report for WO 2015/13202.

*Primary Examiner* — Bradley Duckworth
(74) *Attorney, Agent, or Firm* — Kerr IP Group, LLC

(57) ABSTRACT

A conduit guide apparatus, system, and method for using the conduit guide to fixedly couple a conduit to a support member is described. The conduit guide apparatus includes a first partial cylindrical surface, a second partial cylindrical surface, a first neck segment, a second neck segment, a first arcuate shoulder and a second arcuate shoulder. The first partial cylindrical surface surrounds a first conduit void and a first conduit void axis. The second partial cylindrical surface is adjacent to the first partial cylindrical surface and the second partial cylindrical surface surround a second conduit void. Also, the first partial cylindrical surface and the second partial cylindrical surface include a first end and a second end adjacent to the first end. The first neck segment is adjacent to the first end and surrounds a first channel along a channel axis that is orthogonal to the conduit void axis.

20 Claims, 4 Drawing Sheets

(56) References Cited

U.S. PATENT DOCUMENTS

| | | |
|---|---|---|
| D263,698 S | 4/1982 | Loof et al. |
| 4,367,571 A | 1/1983 | Speirs et al. |
| D269,155 S | 5/1983 | Rose |
| D270,329 S | 8/1983 | Hardy |
| 4,460,142 A | 7/1984 | O'Rourke |
| D289,732 S | 5/1987 | Jason |
| D296,777 S | 7/1988 | Cornell |
| D305,297 S | 1/1990 | O'Neill |
| 4,899,963 A | 2/1990 | Murphy |
| 5,035,084 A | 7/1991 | Towns |
| 5,042,114 A | 8/1991 | Parrish |
| 5,079,802 A | 1/1992 | Blase et al. |
| 5,316,247 A | 5/1994 | Wodka |
| 5,423,501 A | 6/1995 | Yu |
| 5,474,268 A | 12/1995 | Yu |
| D366,606 S | 1/1996 | Nakamura |
| 5,538,208 A | 7/1996 | Cordes et al. |
| 5,568,905 A | 10/1996 | Smith, II |
| D382,794 S | 8/1997 | Karlsen |
| 5,661,841 A | 8/1997 | Noten |
| D383,050 S | 9/1997 | Palmer |
| D387,652 S | 12/1997 | Carlson |
| 5,831,216 A | 11/1998 | Hoffmann |
| D406,749 S | 3/1999 | Selk |
| 6,145,793 A | 11/2000 | Kroulik et al. |
| 6,330,989 B1 | 12/2001 | Okamoto |
| 6,354,545 B1 | 3/2002 | Liao |
| D464,559 S | 10/2002 | Bjorklund |
| 6,533,226 B2 | 3/2003 | Geiger |
| D483,654 S | 12/2003 | Taylor |
| D526,278 S | 8/2006 | Heary |
| D540,153 S | 4/2007 | Tanaka et al. |
| D577,988 S | 10/2008 | Wrase et al. |
| D581,255 S | 11/2008 | Calvin |
| D597,963 S | 8/2009 | Mulch et al. |
| D607,828 S | 1/2010 | Shaw |
| D621,693 S | 8/2010 | Dong |
| 7,854,414 B2 | 12/2010 | Head et al. |
| D644,159 S | 8/2011 | Marcum |
| 7,997,546 B1 | 8/2011 | Andersen et al. |
| D652,288 S | 1/2012 | Mercier |
| D682,222 S | 5/2013 | Crucitti |
| D702,529 S | 4/2014 | Diez Herrera |
| 8,783,630 B2 | 7/2014 | Gronlund et al. |
| D723,363 S | 3/2015 | Symons |
| 9,200,654 B1 | 12/2015 | Parduhn |
| D747,275 S | 1/2016 | Rodrigue |
| D747,276 S | 1/2016 | Rodrigue |
| 9,273,706 B2 | 3/2016 | Rigollet et al. |
| 9,512,941 B2 | 12/2016 | Rodrigue |
| 2003/0234116 A1 | 12/2003 | Uchida et al. |
| 2007/0072477 A1 | 3/2007 | Dieck et al. |
| 2009/0242064 A1 | 10/2009 | Lai |
| 2009/0265894 A1 | 10/2009 | Link et al. |
| 2014/0259620 A1 | 9/2014 | Hicks et al. |

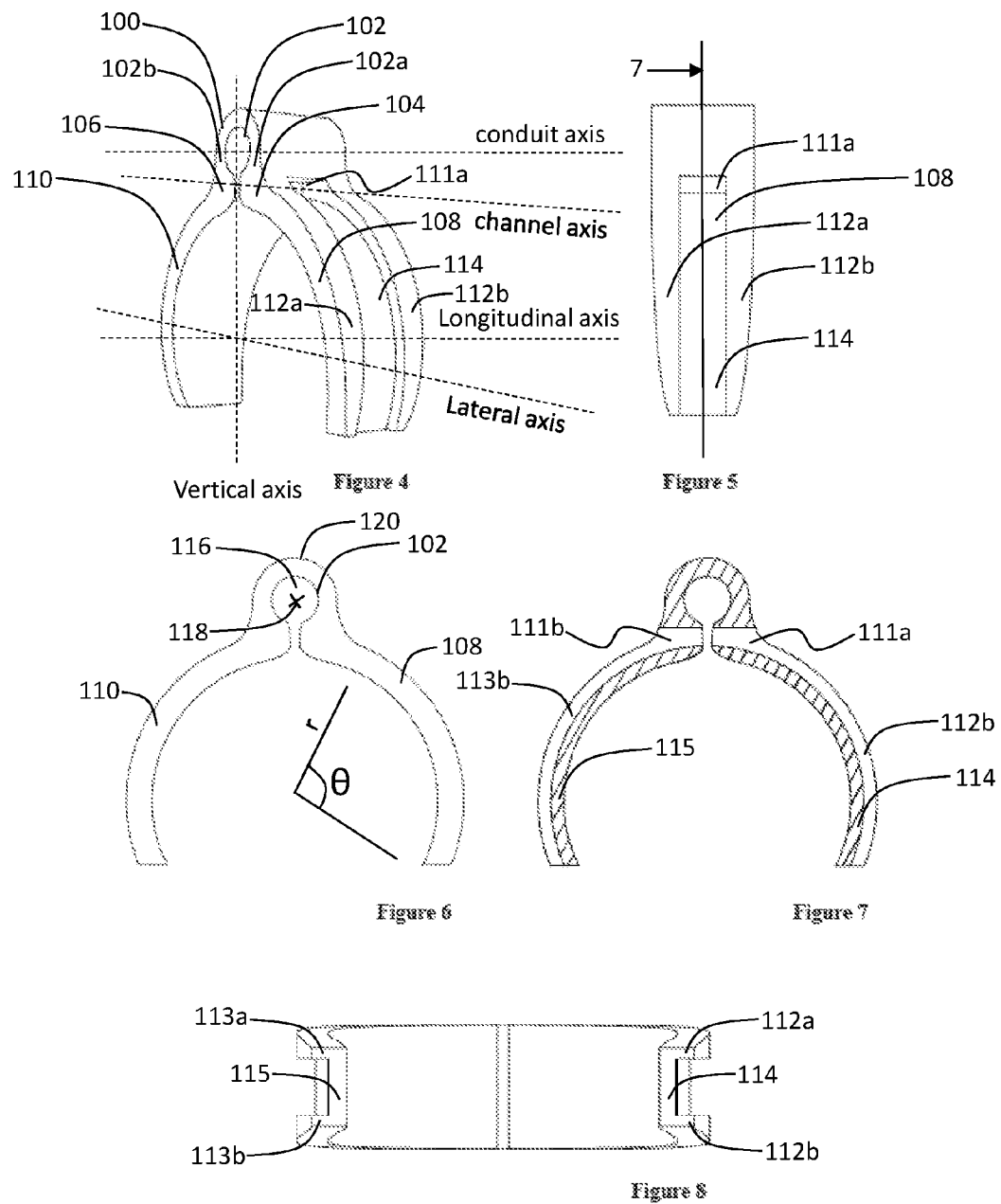

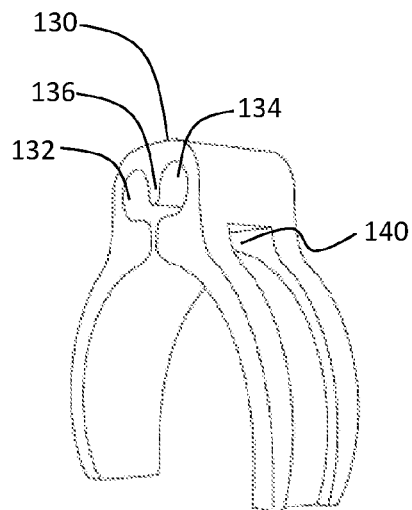
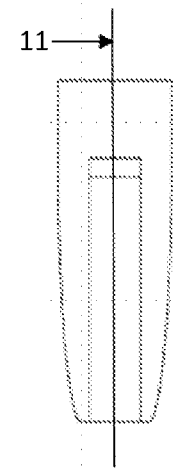
Figure 9A    Figure 9B
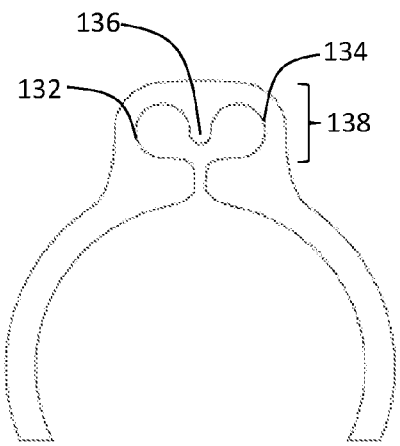
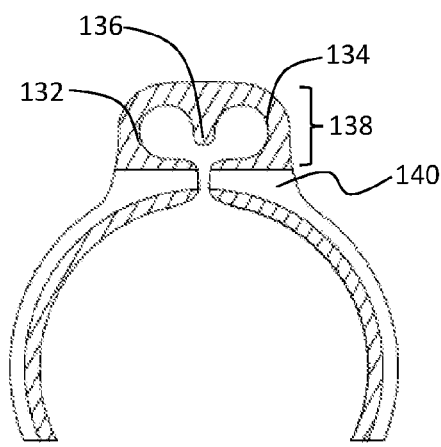
Figure 10    Figure 11

CONDUIT GUIDE APPARATUS, SYSTEM, AND METHOD

CROSS-REFERENCE

This patent application is a continuation of U.S. Ser. No. 14/288,252, which claims the benefit of provisional patent application 61/857,632 entitled CABLE GUIDE filed on Jul. 23, 2013.

FIELD

The invention relates to a conduit guide apparatus, system, and method. More particularly, this invention relates to a conduit guide that interfaces with a support member and can receive a conduit that is substantially parallel to the support member.

BACKGROUND

Throughout a variety of different industries, it is common to have cables or conduits that run along support structures. These cables or conduits can sometimes be part of separate closed systems and are used to conduct electricity, flow hydraulic fluid, house control wires, and provide pressurized air for pneumatic devices. Regardless of the conduit's intended use, it is necessary to properly secure the cable or conduit in a safe, uniform, and visually appealing manner.

Commonly, support structures have cables running along them and come equipped with stationary cable guides that are built into the support structure and cannot be moved. These "fixed" cable or conduit guides only allow for a certain number of cables or a certain diameter of conduit to be routed along a specific route on the support structure. Thus, the fixed guides do not work effectively when there are additional cables or different sized conduits, or the route for the cables and/or conduits are different from the route along the support structure.

If a structure does not accommodate for the cables or conduit to run along it or the fixed guides provided are not preferable, then other fastening methods are required. A popular method for fastening cables to support structures is to use cable-ties, commonly known as "zip-ties" or "wire-ties." Generally, a cable-tie encompasses both the support structure and the cable, and is then tightened to secure the cable to the support structure.

The use of cable ties can cause several problems. For example, improper tightening of the cable tie results in the cable shifting laterally or longitudinally along the support structure. This shifting can degrade the cable's broader system performance and potentially damage the cable and the support structure.

Additionally, excessively tightening the cable ties may also crush the cable or conduit. Crushing the cable or conduit restricts the internal movement of the cable or flow in the conduit. Additionally, crushing the cable in this manner can also weaken the outer cable or conduit housing, which reduces the lifespan of the cable or conduit and may cause broader system failure.

Furthermore, securing cables or conduits with cable ties can also be unsightly. Further still, the cable-ties can cause cosmetic damage to both the cable or conduit and the support structure.

SUMMARY

A conduit guide apparatus, system, and method for using the conduit guide to fixedly couple a conduit to a support member is described. The conduit guide apparatus includes a first partial cylindrical surface, a second partial cylindrical surface, a first neck segment, a second neck segment, a first arcuate shoulder and a second arcuate shoulder. The first partial cylindrical surface surrounds a first conduit void and a first conduit void axis. The second partial cylindrical surface is adjacent to the first partial cylindrical surface and the second partial cylindrical surface surround a second conduit void. Also, the first partial cylindrical surface and the second partial cylindrical surface include a first end and a second end adjacent to the first end. The first neck segment is adjacent to the first end and surrounds a first channel along a channel axis that is orthogonal to the conduit void axis. The second neck segment is adjacent to the second end and surrounds a second channel along the channel axis that is orthogonal to the conduit void axis. The first arcuate shoulder is adjacent to the first neck segment and includes a first grooved outer wall on both sides of a first recess. The second arcuate shoulder is adjacent to the second neck segment and includes a second grooved outer wall on both sides of a second recess.

In one illustrative embodiment, the first partial cylindrical surface and the second partial cylindrical surface includes a flexible apex segment that enables to the first partial cylindrical surface and the second partial cylindrical surface to interface with a plurality of different sized cables or conduits. In another illustrative embodiment, the conduit guide is composed of an elastic compound. In yet another illustrative embodiment, the partial cylindrical surface receives a first conduit and a second conduit.

In a broad illustrative embodiment, the first arcuate shoulder includes a first concave curve that has a first radius and a first angle of approximately 60°-170°, and the second arcuate shoulder includes a second concave curve that has a second radius and a second angle of approximately of 60°-170°. In a narrower embodiment, the first concave curve and the second concave curve share a same radius and a same angle of approximately 60°-120°. In an even narrower embodiment, the first concave curve and the second concave curve share the same radius and the same angle of approximately 80°-100°.

A method for fixedly coupling a conduit to a support member is also described. The method includes the partial cylindrical surface of the conduit guide receiving the conduit. The method then proceeds to position the first arcuate shoulder and the second arcuate shoulder on the support member, in which the conduit is parallel to the support member. The method then proceeds to insert a front end of a cable tie through the first channel and second channel of the neck segments. The front end of the cable tie is then feed through the clasp end of the cable tie. The cable tie interfaces with the first recess of the first arcuate shoulder and the second recess of the arcuate shoulder. The cable tie is then tightened so that the conduit guide is fixedly coupled to the conduit and the support member.

DRAWINGS

FIG. 4 shows an isometric view of a single conduit guide.

FIG. 5 shows a side view of the single conduit guide.

Figure 12:
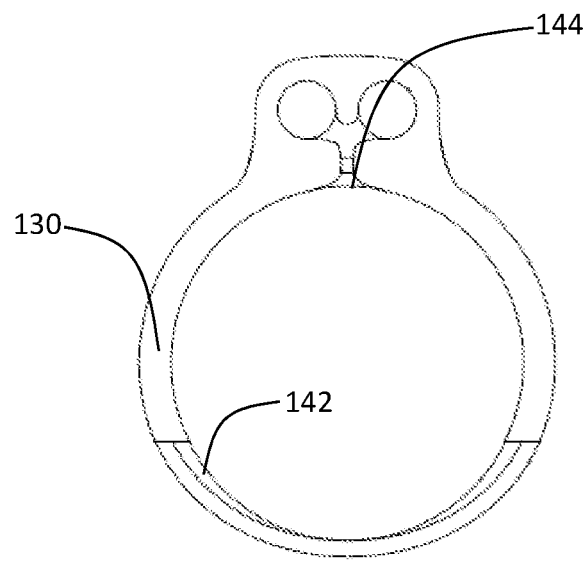
Figure 13:
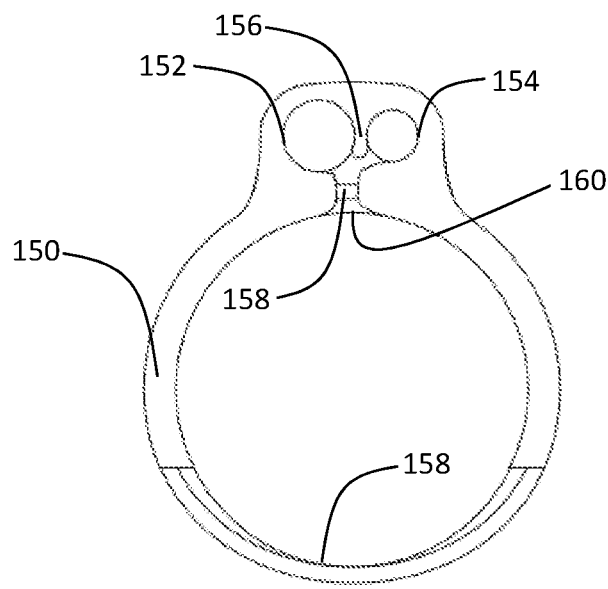

FIG. 6 shows a front view of the single conduit guide.
FIG. 7 shows a sectional view of the single conduit guide.
FIG. 8 shows a bottom view of the single conduit guide.
FIG. 9A shows an isometric view of a dual conduit guide.
FIG. 9B shows a side view of a dual conduit guide.
FIG. 10 shows a front view of the dual conduit guide.
FIG. 11 shows a sectional view of the dual conduit guide.
FIG. 12 shows a front view of the dual conduit guide and a fastener.
FIG. 13 shows a front view of a dual conduit guide with two different sized cavities and a fastener.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and details. Additionally, the methods may vary as to details, order of the actions, or other variations without departing from the illustrative method disclosed herein.

For purposes of this patent the term "conduit" refers to a pipe or tube through which a fluid, wire, or cable passes. By way of example, the fluid may be a polar molecule such as water, a non-polar molecule such as oil or gasoline, or any combination thereof. The conduit may also include one or more wires, in which a single wire refers to a thin flexible thread of an alloy or metal. The conduit may also include a cable which includes a plurality of wires that may be covered with one of a metallic sheath, a plastic material, a rubber or elastomeric material, a glass material, or any combination thereof. Thus, in certain instances the terms "conduit" and "cable" are interchangeable as would readily suggest itself to those of ordinary skill in the art.

The apparatus, systems, and methods presented herein relate to a conduit guide for securing a conduit along a support structure. By way of example and not of limitation, the conduit guide secures conduits of varying diameter to support structures that may vary in both shape and size. Additionally, the conduit guide may be adjusted to allow a conduit or conduits to be substantially parallel to the longitudinal axis of the support structure. Furthermore, the conduit guide braces the conduit or conduits so the conduit or conduits do not move significantly along the lateral axis or vertical axis of the support structure. The conduit guide presented herein may also be referred to as a cable guide or as a universal cable guide.

Figure 1:
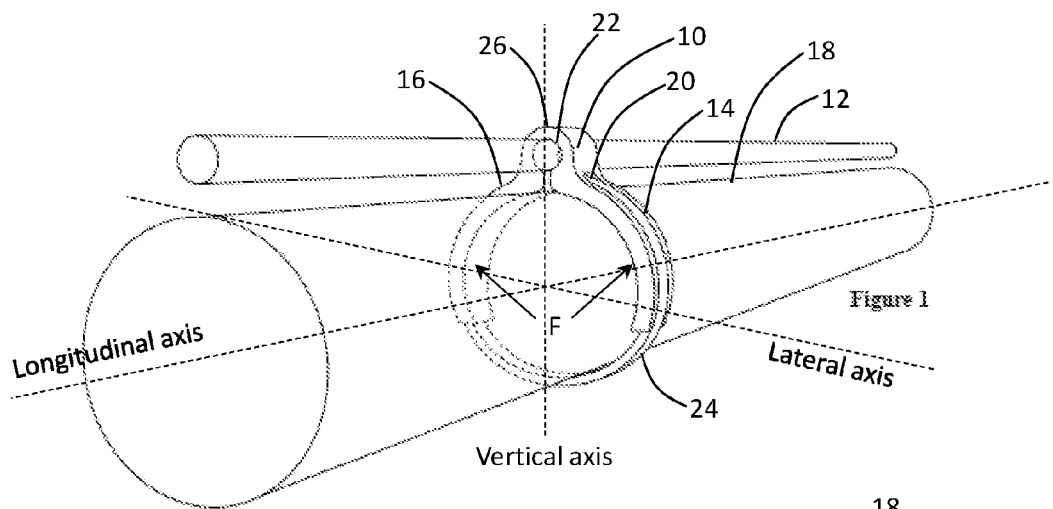
FIG. 1 shows an isometric view of a single conduit guide, a cylindrical support member, a conduit, and a fastener.

Referring to FIG. 1, there is shown an isometric view of an illustrative conduit guide for a single cable, a cylindrical support member, a conduit, and a fastener. An illustrative conduit guide 10 receives an illustrative single cable 12 in a conduit passage that is defined by the looped portion conduit guide 10. The illustrative conduit guide 10 is substantially symmetrical and includes a conduit passage 22 that receives the cable 12. Typically, the conduit passage 22 has a diameter that is smaller than the single cable 12 diameter. The cable guide 10 is composed of a flexible material that can receive single cables having larger cable diameters than single cable 12 diameter.

The conduit guide 10 also includes a first arcuate shoulder 14 and a second arcuate shoulder 16 that can interface with a support structure 18. The illustrative conduit guide 10 also laterally and vertically secures the conduit 12 to the support structure 18. Additionally, the conduit guide 10 allows the cable 12 to move longitudinally.

Also, the conduit cable guide 10 includes a fastener channel 20. The fastener channel 20 is embedded within the single conduit guide 10 and is disposed below the conduit passage 22 that receives conduit 12. The illustrative fastener channel 20 receives a fastener 24, e.g. a cable tie. The height and width of the fastener channel 20 provide sufficient clearance so that the fastener 24 may be feed though fastener channel 20.

In operation, the conduit guide 10 is first separated by applying an upward force F to the arcuate shoulders 14 and 16. The conduit guide 10 flexes about the apex 26 and after the upward force F is released, the conduit guide 10 returns to its former shape. Generally, the conduit passage 22 has a smaller diameter than the diameter of the single cable 12, and since the conduit guide 10 is flexible, the conduit guide 10 operates as a biasing element that applies a small force to the single cable 12 so that the conduit guide 10 is slidably coupled to the single cable along the longitudinal axis.

The conduit guide 10 and the illustrative cable 12 are then placed on the surface of the support member 18. A fastener 24, e.g. a cable tie, is then routed or fed through the fastener channel 20. The fastener 24 secures the cable 12 to the support structure 10. The illustrative fastener 24 is configured to interface with the first recess and the second recess, and it passes through the first fastener channel and the second fastener channel.

More specifically, the conduit guide 10 and fastener 24 secure cable 12 and minimize movement along the lateral axis and the vertical axis. Although some movement along the longitudinal axis is supported by the cable guide 10, this movement is typically limited by the cable length, cable materials, and other engineering and design constraints associated with a properly designed cabling system. Also, the illustrative cable 12 is secured by the cable guide 10 and avoids directly contacting the support structure 18.

Removal of the conduit guide 10 is simply performed by removing or cutting the fastener 24 to separate the conduit guide 10 from the support structure 18. The conduit guide 10 is separated from the cable 12, by applying the substantially vertical force F to the arcuate shoulders 14 and 16.

The conduit guide 10 is composed of a material that is flexible, yet sufficiently rigid or stiff to expand and contract around various cable or conduit diameters and interface with differently sized support structures or members. Additionally, the material has a sufficiently high tensile strength and compressive strength so the conduit guide 10 may be utilized in high temperature and low temperature environments.

Figure 2:
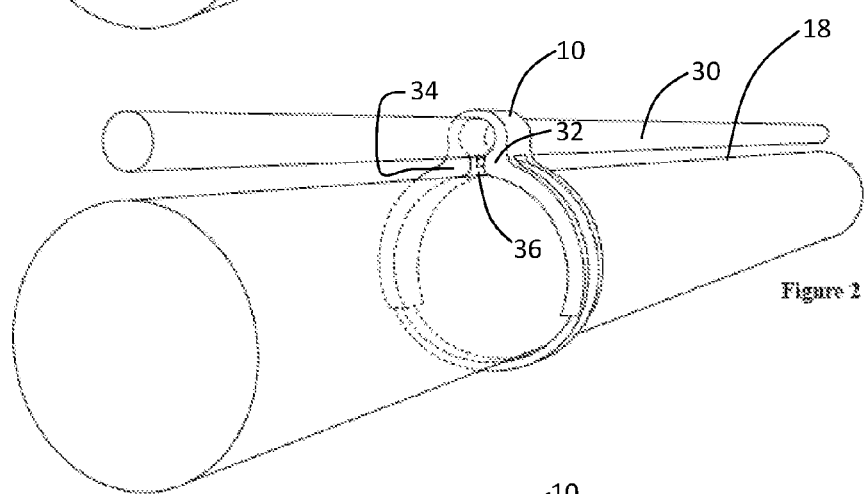
FIG. 2 shows an isometric view of the conduit guide in FIG. 1 coupled to a thick conduit having a larger diameter than the conduit in FIG. 1.

Referring to FIG. 2, there is shown an isometric view of the conduit guide 10 in FIG. 1 coupled to a thick cable 30 having a larger diameter than the cable 12 shown in FIG. 1. The illustrative conduit guide includes a first neck segment 32 and a second neck segment 34 that surround a gap 36. Although the gap 36 is also present in FIG. 1, the gap 36 is much more visible in FIG. 2 because of the cable diameter of thick cable 30. Also, the illustrative cable 30 is secured by the cable guide 10 to avoid directly contacting the support structure 18.

Figure 3:
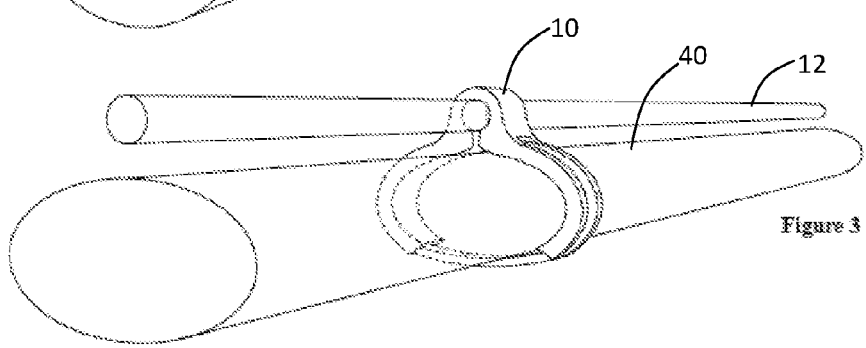
FIG. 3 shows an isometric view of the conduit guide of FIG. 1 coupled to an oval support member.

Referring to FIG. 3, there is shown an isometric view of the conduit guide 10 of FIG. 1 coupled to an oval support member 40. The flexible conduit guide 10 conforms to the oval shape of the support structure 40, while holding the cable 12. Also, the illustrative cable 12 is secured by the cable guide 10 to avoid directly contacting the support structure 40.

Referring to FIG. 4, there is shown an isometric view of an illustrative single conduit guide 100 without the cable, support structure and fastener. The longitudinal axis, lateral axis, and vertical axis are shown in relation to the support structure as presented above in FIG. 1.

The conduit guide 100 includes a partial cylindrical inner surface 102, a first neck segment 104, a second neck segment 106, a first arcuate shoulder 108 and a second arcuate shoulder 110. The partial cylindrical inner surface 102 surrounds a conduit void and a conduit axis that is parallel to the longitudinal axis. Also, the partial cylindrical inner surface 102 is looped so that a first end 102a is adjacent to a second end 102b. The first neck segment 104 is adjacent to the first end 102a. Additionally, the first neck segment 104 surrounds a first fastener channel 111a along a lateral channel axis that is parallel to the lateral axis and orthogonal to the conduit axis.

The second neck segment 106 is adjacent to the second end 102b and surrounds a second fastener channel 111b (not shown) along the lateral channel axis that is orthogonal to the conduit axis. The first arcuate shoulder 108 is adjacent to the first neck segment 104 and includes first grooved outer walls 112a and 112b on both sides of a first recess 114. The second arcuate shoulder 110 is adjacent to the second neck segment 106 and also includes a second grooved outer wall (not shown) on both sides of a second recess (not shown). Alternatively, a single grooved outer wall 112 may be adjacent to the first recess 114, instead of the two grooved outer walls shown.

Referring to FIG. 5, there is shown a side view of the single conduit guide. More specifically, the side view shows the first arcuate shoulder 108, which includes a first grooved outer walls 112a and 112b that are on both sides of a first recess 114.

Referring to FIG. 6, there is shown a front view of the single conduit guide. The partial cylindrical inner surface 102 surrounds a conduit void 116 that receives the conduit or cable. A conduit axis 118 is parallel to the longitudinal axis.

The conduit guide 100 includes a flexible head segment 120 at the apex of the conduit guide, which enables the conduit guide to interface with a variety of different sized cables or conduits. The materials properties of the conduit guide include plastic and elastic compounds.

In a broad illustrative embodiment, the first arcuate shoulder 108 includes a first concave curve that has a first radius, r, and a first angle, θ, of approximately 60°-170°, and the second arcuate shoulder 110 includes a second concave curve that has a second radius and a second angle of approximately of 60°-170°. In a narrower embodiment, the first concave curve and the second concave curve share a same radius, r, and a same angle, θ, of approximately 60°-120°. In an even narrower embodiment, the first concave curve and the second concave curve share the same radius, r, and the same angle, θ, of approximately 80°-100°.

In an alternative embodiment, one arcuate shoulder may have a different radius or a different angle than the other arcuate shoulder. In another alternative embodiment, the cable guide may only include one arcuate shoulder that is coupled to the partial cylindrical inner surface.

Referring to FIG. 7, there is shown a sectional view on line 7 of FIG. 5 for the single conduit guide. The first arcuate shoulder 108 includes the grooved outer wall 112b which is adjacent to the first recess 114. The second arcuate shoulder 110 includes the grooved outer wall 113b which is adjacent to the second recess 115.

Referring to FIG. 8, there is shown a bottom view of the single conduit guide. With respect to the first arcuate shoulder, the recess 114 is shown between the grooved outer walls 112a and 112b. For the second arcuate shoulder, the recess 115 is shown between the grooved outer walls 113b and 113b.

Referring to FIG. 9A, there is shown an isometric view of a dual conduit guide 130. The conduit guide 130 is similar to the conduit guide presented above, however, conduit guide 130 includes a first partial cylindrical inner surface 132 and a second partial cylindrical inner surface 134 that are separated by a nipple 136. The first partial cylindrical inner surface 132 is configured to receive a first conduit or cable and the second partial cylindrical inner surface 134 is configured to receive a second conduit or cable.

Referring to 9B, there is shown a side view of the dual conduit guide. More specifically, the side view shows a first arcuate shoulder that includes a first grooved outer wall on both sides of a first recess as described previously.

Referring to FIG. 10, there is shown a front view of the dual conduit guide that includes a head component 138. The head component 138 is disposed above the fastener channel 140 (shown on FIG. 11). Thus, the head portion 138 of conduit guide 130 includes the first partial cylindrical inner surface 132, the second partial cylindrical inner surface 134, and the nipple 136 that separates the first and second partial cylindrical inner surfaces.

Referring to FIG. 11, there is shown a sectional view on line 11 of FIG. 9B for the dual conduit guide. The sectional views shows the fastener channel 140 disposed below the head portion 138. Additionally, the head portion 138 includes the first partial cylindrical inner surface 132, the second partial cylindrical inner surface 134, and the nipple 136 that separates the first and second partial cylindrical inner surfaces.

Referring to FIG. 12, there is shown a front view of the dual conduit guide 130, a fastener 142, and a support member 144. The fastener 142 is configured to interface with the first recess and the second recess, and passes through the first channel and the second channel as described above.

Referring to FIG. 13, there is shown a front view of a dual conduit guide 150 with two different sized cavities. More specifically, the dual conduit guide 150 includes a head component having a first partial cylindrical inner surface 152 that is different from the second partial cylindrical inner surface 154. The first partial cylindrical inner surface 152 is configured to receive a larger cable or conduit than the second partial cylindrical inner surface 154. A nipple 156 that separates the first and second partial cylindrical inner surfaces. The fastener 158 is configured to interface with the support structure 160 and the first recess and the second recess, and the fastener passes through the first channel and the second channel, as described above.

In another illustrative embodiment, the conduit guide includes a head portion with three or more partial cylindrical inner surfaces in the head portion of the cable guide. In another illustrative embodiment the conduit guide includes a plurality of heads, in which each head includes at least one partial cylindrical surface that is configured to receive at least one conduit or cable.

A method for fixedly coupling a conduit to a support member with a conduit cable is also described. The method includes having the partial cylindrical surface of the conduit guide receive a conduit or cable. The method then proceeds to position the first arcuate shoulder and the second arcuate shoulder on the support member or structure. The conduit or cable that is held by the conduit guide runs parallel to the support member. The method then proceeds to insert a fastener through the first fastener channel and second fastener channel that are disposed along the neck segments described above. In the illustrative embodiment, the fastener is a cable tie and the front end of the cable tie passes through the first fastener channel and second fastener channel. The front end of the illustrative cable tie is then feed through the clasp end of the cable tie. The cable tie interfaces with the first recess of the first arcuate shoulder and the second recess of the second arcuate shoulder. The cable tie is then tightened so that the conduit guide is fixedly coupled to the conduit and the support member.

In certain embodiments of the present invention, the conduit guide is designed to accommodate a single conduit. Other embodiments are designed to accommodate multiple conduits. Additionally, other embodiments are designed to accommodate considerably different sized conduits and support structures.

The technical advantage of the conduit guide apparatus provides a simplified installation process that does not require a "fixed" cable or conduit guides, and does not require the disassembly of the conduit or the structural support system. Another advantage of the conduit guide apparatus, system, and method presented above is that a cable or conduit guide that can be used across a multitude of industries that can accommodate a range of cable or conduit types and diameters. Additionally, the conduit guide can conform to different size and shaped support structures. Furthermore, the conduit guide uniformly secures the conduit laterally and vertically. Further still, the conduit guide allows the conduit to move longitudinally.

It is to be understood that the detailed description of illustrative embodiments provided for illustrative purposes. The scope of the claims is not limited to these specific embodiments or examples. Various structural limitations, elements, details, and uses can differ from those just described, or be expanded on or implemented using technologies not yet commercially viable, and yet still be within the inventive concepts of the present disclosure. The invention should therefore not be limited by the above described embodiment, method, and examples, but by all embodiments and methods within the scope and spirit of the invention as claimed. Thus, the scope of the invention is determined by the following claims and their legal equivalents.

What is claimed is:

1. A conduit guide apparatus comprising,
   a first partial cylindrical surface surrounding a first conduit void and a first conduit void axis;
   a second partial cylindrical surface adjacent to the first partial cylindrical surface, wherein the second partial cylindrical surface surrounds a second conduit void;
   wherein the first partial cylindrical surface and the second partial cylindrical surface includes a first end and a second end adjacent to the first end;
   a first neck segment adjacent to the first end, wherein the first neck segment surrounds a first channel along a channel axis;
   a second neck segment adjacent to the second end, wherein the second neck segment surrounds a second channel along the channel axis;
   a first arcuate shoulder adjacent to the first neck segment, the first arcuate shoulder including a first grooved outer wall, the first grooved outer wall defining a first arcuate recess, the first arcuate recess configured to receive a flexible fastener; and
   a second arcuate shoulder adjacent to the second neck segment, the second arcuate shoulder including a second grooved outer wall, the second grooved outer wall defining a second arcuate recess, the second arcuate recess configured to receive the flexible fastener.

2. The conduit guide apparatus of claim 1 wherein the first partial cylindrical surface and the second partial cylindrical surface includes a flexible apex segment that enables the first partial cylindrical surface and the second partial cylindrical surface to interface with at least one of a plurality of different sized conduits and cables.

3. The conduit guide apparatus of claim 1 composed of an elastic compound.

4. The conduit guide apparatus of claim 1 wherein the first partial cylindrical surface receives a first conduit and the second partial cylindrical surface receives a second conduit.

5. The conduit guide apparatus of claim 1 wherein the first arcuate shoulder includes a first concave curve that has a first radius and a first angle of approximately 60°-170°.

6. The conduit guide apparatus of claim 5 wherein the first concave curve and the second concave curve share a same radius and a same angle of approximately 60°-120°.

7. The conduit guide apparatus of claim 5 wherein the first concave curve and the second concave curve share a same radius and a same angle of approximately 80°-100°.

8. A conduit guide system comprising,
   a first partial cylindrical surface surrounding a first conduit void and a conduit void axis;
   a second partial cylindrical surface adjacent to the first partial cylindrical surface, wherein the second partial cylindrical surface surrounds a second conduit guide;
   wherein the first partial cylindrical surface and the second partial cylindrical surface includes a first end and a second end adjacent to the first end;
   a first neck segment adjacent to the first end, wherein the first neck segment surrounds a first channel along a channel axis that is orthogonal to the conduit void axis;
   a second neck segment adjacent to the second end, wherein the second neck segment surrounds a second channel along the channel axis that is orthogonal to the conduit void axis;
   a first arcuate shoulder adjacent to the first neck segment, the first arcuate should including a first grooved outer wall, the first grooved outer wall defining a first arcuate recess;
   a second arcuate shoulder adjacent to the second neck segment, the second arcuate shoulder including a second grooved outer wall, the second grooved outer wall defining a second arcuate recess; and
   a flexible fastener configured to interface with the first arcuate recess and the second arcuate recess, the flexible fastener configured to pass through the first channel and the second channel.

9. The conduit guide apparatus of claim 8 wherein the first partial cylindrical surface and the second partial cylindrical surface includes a flexible apex segment that enables the first partial cylindrical surface and the second partial cylindrical surface to interface with at least one of a plurality of different sized conduits and cables.

10. The conduit guide apparatus of claim 8 composed of an elastic compound.

11. The conduit guide apparatus of claim 8 wherein the first partial cylindrical surface receives a first conduit and the second partial cylindrical surface receives a second conduit.

12. The conduit guide apparatus of claim 8 wherein the first arcuate shoulder includes a first concave curve that has a first radius and a first angle of approximately 60°-170°.

13. The conduit guide apparatus of claim 12 wherein the first concave curve and the second concave curve share a same radius and a same angle of approximately 60°-120°.

14. The conduit guide apparatus of claim 12 wherein the first concave curve and the second concave curve share a same radius and a same angle of approximately 80°-100°.

15. A method for coupling a conduit to a support member with a conduit guide, the method comprising,
receiving the conduit on a partial cylindrical surface of the conduit guide, wherein the conduit guide includes,
the partial cylindrical surface surrounding a conduit void and a conduit void axis that receives the conduit, wherein the partial cylindrical surface includes a first end and a second end adjacent to the first end,
a first neck segment adjacent to the first end, wherein the first neck segment surrounds a first channel along a channel axis that is orthogonal to the conduit void axis,
a second neck segment adjacent to the second end, wherein the second neck segment surrounds a second channel along the channel axis that is orthogonal to the conduit void axis,
a first arcuate shoulder adjacent to the first neck segment, the first arcuate shoulder including a first grooved outer wall, the first grooved outer wall defining a first arcuate recess, and
a second arcuate shoulder adjacent to the second neck segment, the second arcuate shoulder including a second grooved outer wall, the second grooved outer wall defining a second arcuate recess;
positioning the first arcuate shoulder and the second arcuate shoulder on the support member, wherein the conduit is parallel to the support member;
inserting a front end of a cable tie through the first channel and second channel of the neck segments;
feeding the front end of the cable tie through a clasp end of the cable tie, wherein the cable tie interfaces with the first recess of the first arcuate shoulder and the second recess of the arcuate shoulder; and
tightening the cable tie so that the conduit guide is fixedly coupled to the conduit and the support member.

16. The method of claim 15 further comprising enabling the partial cylindrical surface to interface with a plurality of different sized conduits with a flexible apex segment disposed on the partial cylindrical surface.

17. The method of claim 15 further comprising receiving a single conduit.

18. The method of claim 15 further comprising receiving at least two conduits with a second partial cylindrical surface adjacent to the first partial cylindrical surface, wherein the first partial cylindrical surface receives a first conduit and the second partial cylindrical surface receives a second conduit.

19. The method of claim 15 wherein the positioning of the first arcuate shoulder and the second arcuate shoulder on the support member includes,
the first arcuate shoulder having a first concave curve that has a first radius and a first angle of approximately 60°-170°.

20. The method of claim 15 wherein the positioning of the first arcuate shoulder and the second arcuate shoulder on the support member includes the first concave curve and the second concave curve sharing a same radius and a same angle of approximately 80°-100°.

* * * * *